United States Patent [19]
Nowacek

[11] Patent Number: 5,873,208
[45] Date of Patent: Feb. 23, 1999

[54] ROOF SHINGLES AND A METHOD OF MAKING THE SAME

[76] Inventor: David Nowacek, 1100 NE. Loop 410, Suite 617, San Antonio, Tex. 78209

[21] Appl. No.: 826,027

[22] Filed: Mar. 28, 1997

Related U.S. Application Data

[60] Provisional application No. 60/031,864 Nov. 27, 1996.
[51] Int. Cl.⁶ ....................................................... E04D 1/22
[52] U.S. Cl. ................................ 52/518; 52/544; 52/549; 52/557; 52/745.2; 52/748.1; 52/DIG. 9
[58] Field of Search ............................ 52/DIG. 9, 748.1, 52/745.2, 549, 557, 544, 518

[56] References Cited

U.S. PATENT DOCUMENTS 3,803,792  4/1974  Fulton .
4,694,716  9/1987  Sakamoto .
5,086,552  2/1992  Moore .

*Primary Examiner*—Christopher Kent
*Attorney, Agent, or Firm*—Miller, Sisson, Chapman & Nash, P.C.

[57] ABSTRACT

Roof shingles (14) from used tires (10) are provided as well as a method of making the same. Used tires (10) are cut along the circumference on each edge to separate a tread piece (13) from the side walls (12) and the bead steel. Tread piece (13) is then cut by dye, shear, or other method into a number of shorter pieces or shingles (14). The shingles are then secured in overlapping relationship, typically tread side outward, to form a waterproof covering on a building or other structure.

17 Claims, 3 Drawing Sheets

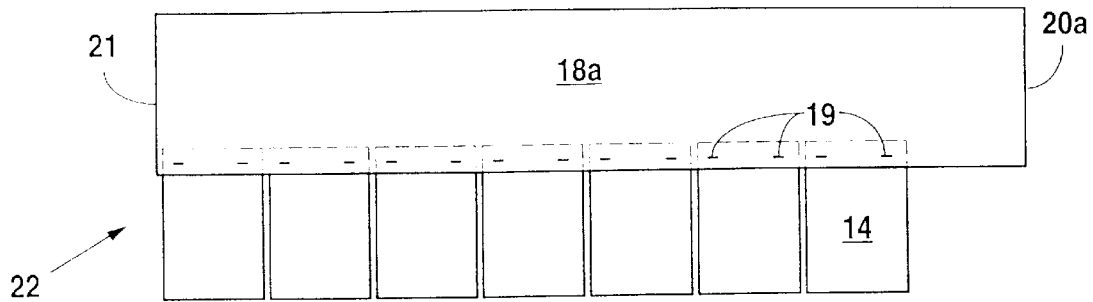
Fig. 8
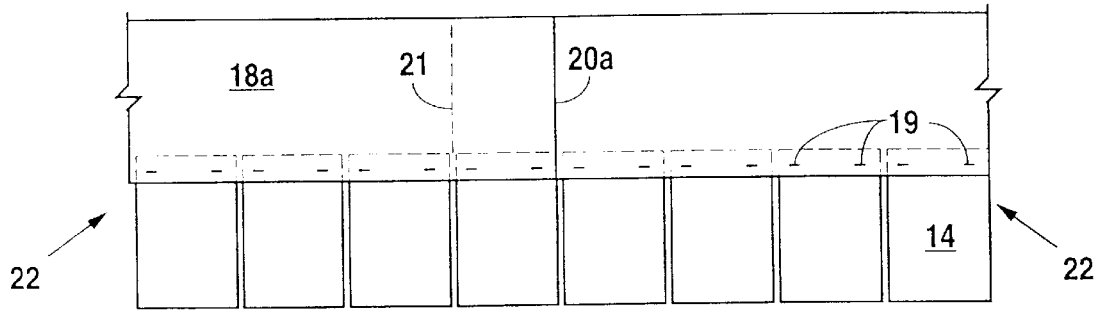
Fig. 9
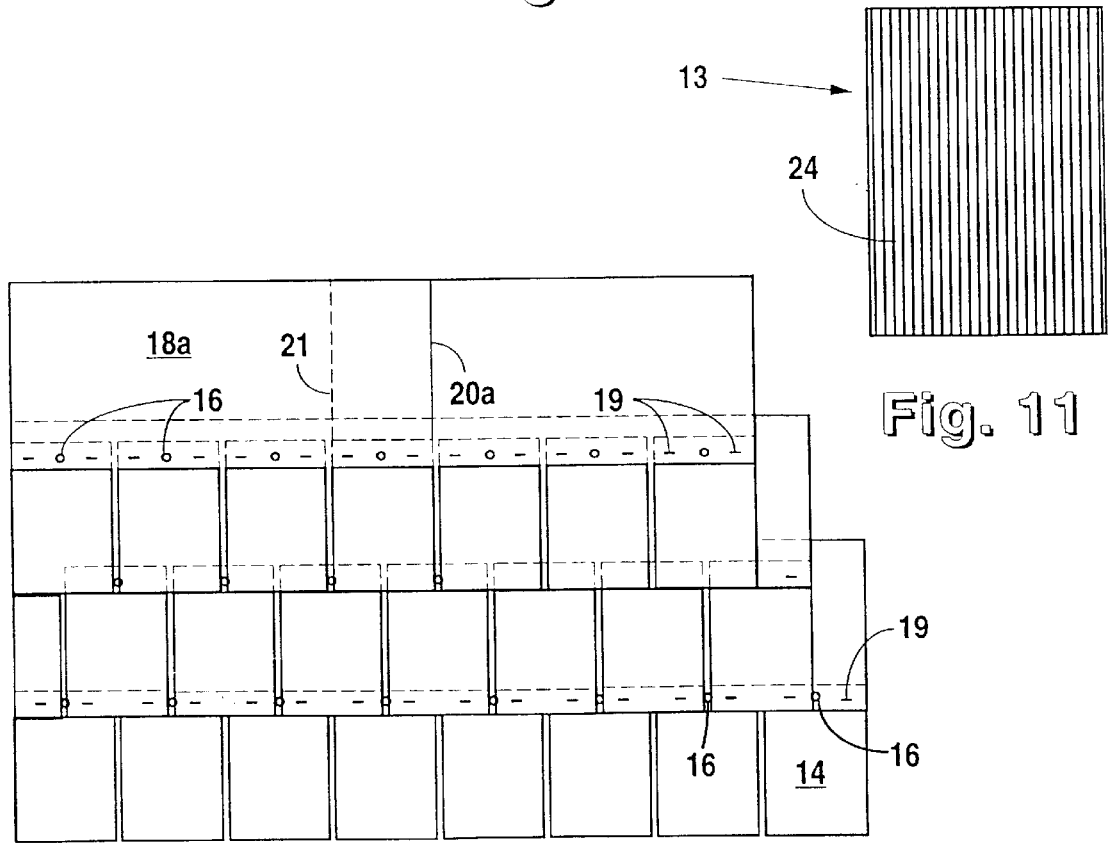
Fig. 11
Fig. 10

ROOF SHINGLES AND A METHOD OF MAKING THE SAME

This application claims the benefit under 35 U.S.C. 119(e) of United States provisional application Ser. No. 60/031,864, filed Nov. 27, 1996.

FIELD OF THE INVENTION

The present invention relates to a method of utilizing tire pieces as shingles in building construction, and a roof or wall shingle or covering made from tire tread.

BACKGROUND OF THE INVENTION

Scrap tires represent a significant waste disposal problem. Improper disposal results in increased human health risks and environmental damage. A number of issued patents are directed at the disposal problem by providing for recycling vehicle tires as shingles. For example, U.S. Pat. No. 5,086,552 (Moore 1992) discloses a method of recycling a vehicle tire comprising cutting the vehicle tire into separate pieces by radial cuts, each extending from the inner periphery to the outer periphery of the tire, and securing such cut tire pieces in overlapping relationship as shingles for a roof. U.S. Pat. No. 3,803,792 (Fulton 1974) also discloses a method for constructing a tire roof. The '792 patent illustrates a method for constructing a roof covering out of vehicle tires with the tires being cut and segmented in a specific manner. The '792 patent also discloses use of the tread portion segmented into flat portions to form one type of roof covering. The tread portion shingles disclosed are laid lengthwise perpendicular to the pitch of the roof.

SUMMARY OF THE INVENTION

The object of the present invention is to convert scrap tires into other useful products.

A further object is to provide a shingle product that appears and handles similarly to conventional shingles.

To this end, tires are cut along the circumference on each edge separating the tread piece from the side walls and bead steel. The tread piece is then cut by dye or shear into shorter pieces or shingles. These shingles are then secured in an overlapping relationship as conventional shingles, tread side outward to form a waterproof covering on a building or structure, for example, on a roof and/or wall(s) of a building or structure.

Different appearances may be obtained by altering the tread pattern on each shingle by cutting, shaving, buffing or applying heat before or after the tread piece has been separated from the side wall, prior to or after the tread piece has been cut up into shingles. The edge of each shingle may be cut to a desired pattern, for example: straight-cut, scalloped, pointed, etc.

Shingles may also be attached to a backing material member (such as plastic, metal, wood, rubber, etc.) to create a unitized shingle panel.

Attaching shingles to a single-ply or multi-ply backing material member significantly decreases shingle installation time, increases weather resistance, and, depending on the backing material, the strength and fire resistance of the roof system.

Individual shingles are attached to the backing material by mechanical fasteners, rivets, staples, screws, glue, mastic, or by crimping or vulcanizing (melting) the backing material member to the shingle.

Unitized shingle panels can be any size to facilitate installation and can be secured to the structure by nails, screws, or pneumatic fasteners.

BRIEF DESCRIPTION OF THE DRAWINGS

FIG. 8 shows a unitized shingle panel from FIGS. 6 and 7a showing a lap edge (cross hatched for clarity).

FIG. 9 shows two unitized shingle panels from FIG. 8 joined by a lap edge from FIG. 8.

FIG. 10 shows multiple unitized shingle panels from FIGS. 6, 7a, 8, and 9 arranged in a mutually overlapping manner to form a waterproof covering, as shingles on a roof or wall.

FIG. 11 is a front elevational view of a shingle that has been texturized by buffing.

DETAILED DESCRIPTION OF THE PREFERRED EMBODIMENT

Figure 1:
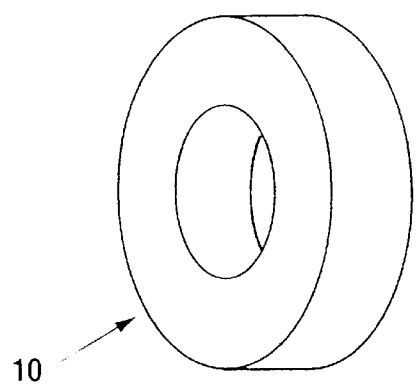
FIG. 1 shows a vehicle tire prior to cutting.
Figure 2:
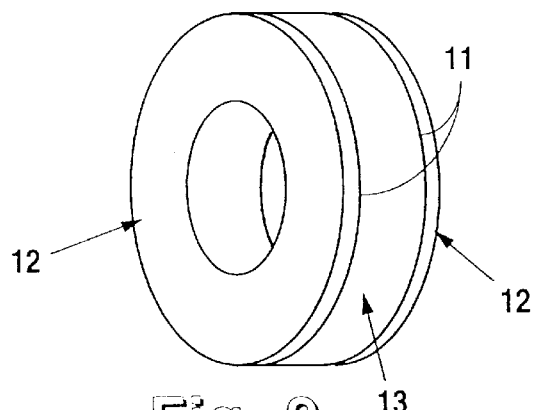
FIG. 2 shows an expanded view of the tire after both side walls are cut away by means of perimeter cuts along the circumference of the tire creating the tread piece.

FIG. 1 indicates a vehicle tire 10 which may or may not have a tread pattern remaining. The tire 10 is converted to other useful products by cutting along each perimeter edge 11 along the circumference of the tire. The usual cut is done outside the steel tread portion of the tread. Where the flat section of tread starts to bend into the side wall, there are sometimes "ears" or "shoulders" which curve downward at the edge of the tread. These may, in the alternative, be cut off to produce a flatter-shaped shingle with a more uniform thickness. The cutting machine usually has a circular blade or is a side wall remover known in the art.

Once cut, what remains are side wall pieces 12 (typically two per tire) and a tread piece 13. The outer surface of tread piece 13 may be textured for aesthetic reasons, to reduce the degree of thickness, to reduce the weight of the shingle, and to mask the fact that the shingle is manufactured from tires. The texturing may be accomplished by utilizing a buffing machine, a rasp, or a heated iron before cutting of the tread strip into shingles, or after. Use of a planer, surfacer, or other suitable machine will achieve a desired texture to the outer surface of the tread piece.

Figure 3:
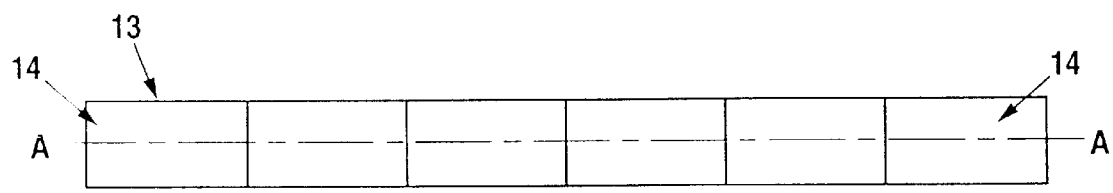
FIG. 3 shows the tread piece from FIG. 2 cut into shorter pieces or shingles.
Figure 4A:
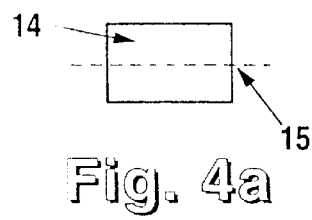
FIGS. 4a–4c show examples of shingles from FIG. 3 with various edge patterns.
Figure 4B:
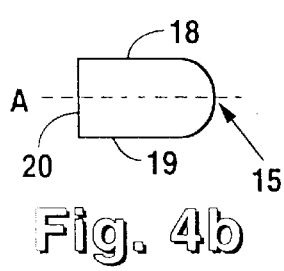
Figure 4C:
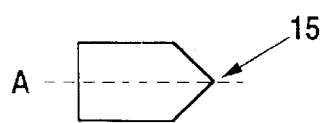

Tread piece 13 is cut by a dye or shear as shown in FIG. 3 into shorter pieces or shingles 14. Shingles 14 may have various edges applied or cut to achieve a desired architectural effect as shown in FIGS. 4a–4c. Lower wall 15 may be shaped, for example, as set forth in FIGS. 4a–4c.

Figure 5:
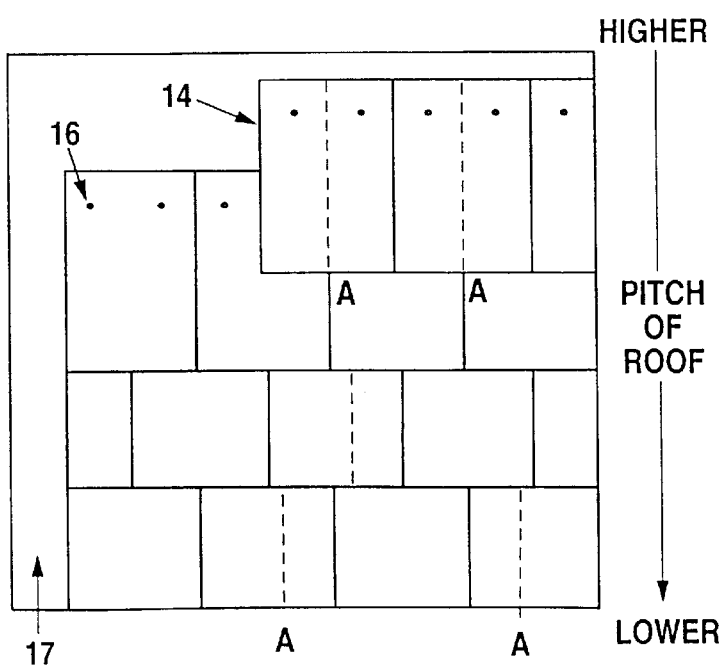
FIG. 5 shows multiple shingles from FIGS. 3 and 4 arranged in a mutually overlapping manner to form a water-proof covering, as shingles on a roof or wall.

Shingles 14 may then be treated to achieve a desired color and/or fire resistance and applied to a roof or a wall of a building structure as shown in FIGS. 5 and 10, preferably with the tread face or outer wall outward, allowing the natural curve of the shingle (along its longitudinal axis) to curve downward overlapping the shingle below.

Figure 6:
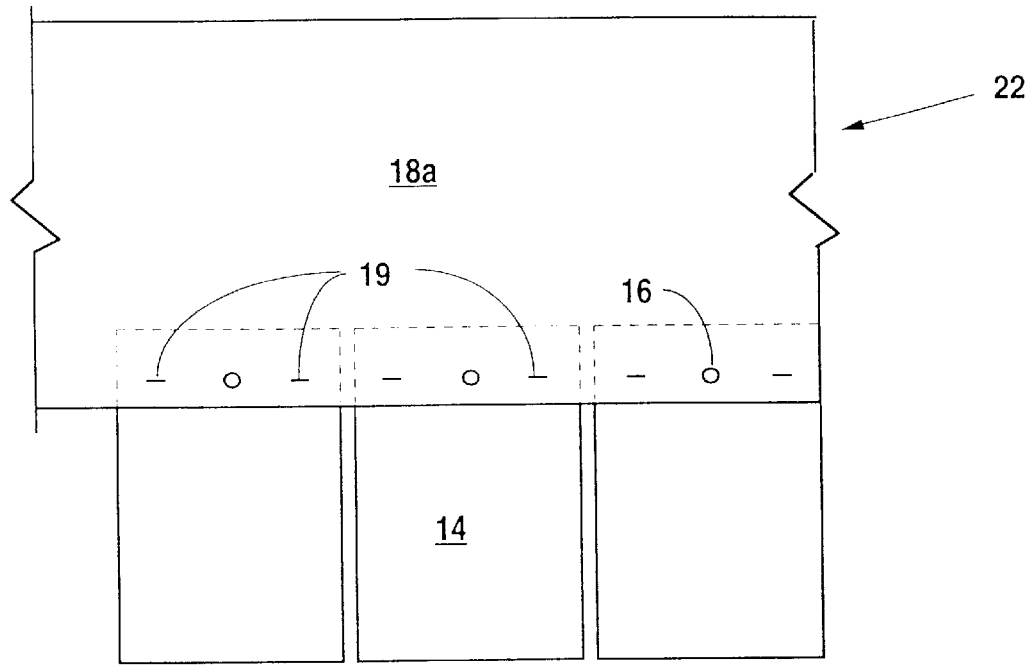
FIG. 6 shows a backing material member with shingles from FIGS. 3 and 4 attached to form a unitized shingle panel.

Prior to installation, shingles 14 may be attached to a backing material member 18a shown in FIG. 6 which is typically rectangular to form a unitized panel 22. The backing material member may be made of plastic, metal, wood, rubber, etc. The shingles are attached to the backing material member 18a by fasteners 18, such as mechanical fasteners, rivets, staples, screws, or with glue, mastic, or by crimping or vulcanizing (melting) backing material member 18a to shingles 14. A preferred fastener is a staple available from Senco Co. that penetrates only partially through the backing material member, thus giving a thinner profile to the panel. A preferred backing material is 10–40 mil HDPE. A length of backing material is left unattached to shingles to form a lap edge 20a as shown in FIG. 8. Unitized panels 22 result from such attachment and have the longitudinal axis of the backing material member generally perpendicular to the axes of the shingles. The unitized panels will also have a straight edge 21.

Figure 7A:
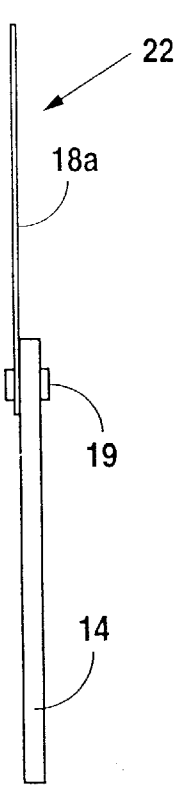
FIG. 7a shows a side elevational view of a unitized shingle panel from FIG. 6.
Figure 7B:
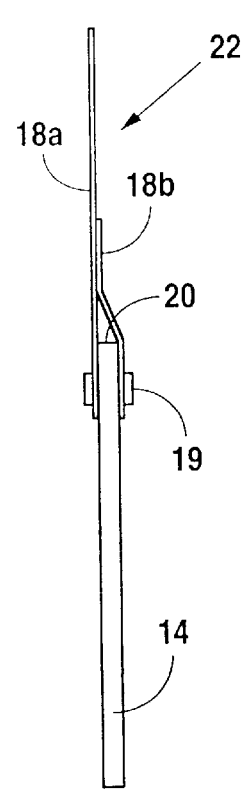
FIGS. 7b and 7c are side elevational views of a unitized shingle panel showing other methods which entail the attachment of a partial and full second backing material member.
Figure 7C:
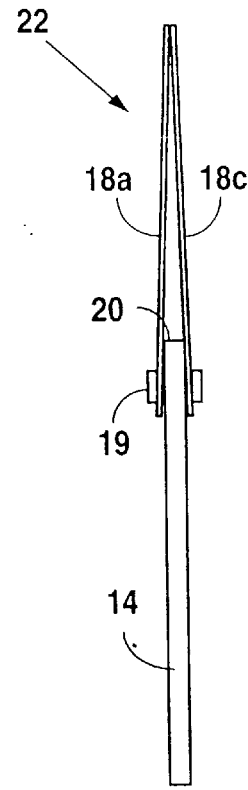

FIGS. 7b and 7c illustrate the use of a second backing material member 18b or 18c to sandwich the upper edge of shingle 14 by fastening both sections of the backing material members and the shingle together. FIG. 7b illustrates a shortened second backing material member 18b attached to backing material member 18a and shingle 14. FIG. 7c illustrates a full-width backing material member 18c attached to backing material member 18a and shingle 14. When utilizing a second backing material member, it may be comprised of the same or different materials than the first backing material member. The two backing material members may be fastened one against the other before installation on a roof or wall, or may be joined as part of fastening the unitized panel to the roof or wall.

Unitized panels 22 may be applied to a roof or wall by placing lap edge 20a of one panel over the straight edge 21 of an adjacent panel to form a water-tight joint, as shown in FIGS. 9 and 10.

Unitized panels 22 may be installed on a roof or wall as shown in FIG. 10 by fastening each panel over the panel below in a mutually overlapping manner to form a waterproof covering.

It is noted here that applicant's unique method includes, in a preferred embodiment, installing the shingles with the outer surface or tread sides facing up and overlapping, as set forth in FIG. 5. Moreover, it is noted that the shingles are placed with the longitudinal axis "A" (see FIGS. 3–5) aligned with the pitch of the roof. Applicant's method is advantageous in that it provides a more effective seal. Shingles 14 are secured by fasteners 16 in a variety of patterns to a roof or a wall 17 as indicated in FIG. 5.

The present invention includes shingles cut from treads, preferably steel-belted treads, wherein the shingles have four edges or walls designated in FIGS. 4a–4c as lower wall 15, side walls 18 and 19, and upper wall 20. As can be seen in FIGS. 4a–4c and 5, the two side walls and the upper wall are typically made with the two side walls 18 and 19 parallel to one another and perpendicular to upper wall 20. In the embodiment indicated in FIG. 4a at the top, lower wall 15 is also perpendicular to produce a rectangular shingle. In the middle and bottom embodiments illustrated in FIGS. 4b and 4c, lower wall 15 is curved and pointed respectively. Nonetheless, in all the embodiments illustrated, it is noted that the three walls 18, 19 and 20 stand as set forth above and create shingle 14 with a longitudinal axis as indicated that is utilized by placing on a roof or wall with the longitudinal axis set parallel to one another and aligned with the pitch of the roof or wall.

FIG. 11 illustrates an alternate preferred shingle 14 which has its outer surface (the tire tread surface) texturized by buffing to create many grooves parallel to the longitudinal axis of the shingle for improved aesthetics and ease of runoff.

Panels were attached to a 3'×5', ⅜" thick plywood board with 6 rows overlapping in traditional roof building technique (tread side up) and subjected to variable wind speeds up to 60 mph across a range of roof pitch angles from 10° to 45° and showed the shingles to be stable with no shingle uplift or permanent damage. An ASTM E-108 Burning Brand Test was performed on the panels, and the panels passed the Class C designation.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A method of covering a pitched roof of a building structure, the method comprising the steps of:
   providing, from a vehicle tire, a multiplicity of tire tread sections, the tread sections having an outer surface and an inner surface and a longitudinal axis;
   securing, in overlap fashion, the multiplicity of tire sections to the roof of the building structure with the longitudinal axis of the overlapping tire sections parallel to one another and to the pitch of the roof.

2. The method of claim 1, wherein the securing step further includes the step of rotating the tire tread sections before application to the roof or wall so that the outer surface is facing outward.

3. The method of claim 2, wherein the providing step further includes providing a first backing material member having a longitudinal axis and the method further includes, after the providing step, the step of forming a unitized panel having side edges by attaching the tire tread sections of the providing step to the first backing material member such that the longitudinal axes of the tire tread section and the backing material member are generally perpendicular.

4. The method of claim 3, wherein the securing step further includes the step of securing multiple tire tread sections and then securing the unitized panels to the roof or the wall by overlapping the first backing material members such that the inner surface of the tread sections of one unitized panel at least partly overlays the first backing material member of another unitized panel.

5. The method of claim 4, wherein the securing step further includes the step of overlapping the side edges of the adjacent unitized panels.

6. The method of claim 3, wherein the providing step includes the step of securing a second backing material member to the first backing material member to form a unitized panel.

7. A shingle for covering a roof of a building structure, the shingle comprising:
   a tire tread section with an outer surface and an inner surface and having four walls, including two side walls and upper wall and a lower wall, the two side walls parallel to one another and longer than either of the upper or the lower walls, the side walls perpendicular to the upper wall, the tread section for fastening to the roof of the structure with a longitudinal axis of the tire tread section aligned with the pitch of the roof.

8. The shingle of claim 7 wherein the outer surface of the tread section has a texturized face.

9. The shingle of claim 8, wherein the texturized face includes a multiplicity of grooves running parallel to a longitudinal axis of the shingle.

10. The shingle of claim 7, wherein the lower wall takes one of the following shapes: straight, rounded or pointed.

11. The shingle of claim 7, wherein the tire tread section is treated with a fire retardant.

12. The shingle of claim 7, wherein the tire tread section is treated to provided coloration thereto.

13. A panel for covering the wall or roof of a building structure, the panel comprising:

a first rectangular backing material member having a longitudinal axis, a top and a bottom surface, a top and a bottom wall, and two side walls;

a multiplicity of tire tread sections, each of said tire tread sections being generally rectangular and having a longitudinal axis, an outer surface, an inner surface, a top and a bottom wall, and two side walls;

means for attaching multiple tire tread sections to said first rectangular backing material member;

wherein said multiple tire tread sections are attached to the first rectangular backing material member such that the longitudinal axis of said first rectangular backing material member is perpendicular to the longitudinal axes of the multiple tire tread sections which form the panel.

14. The panel of claim 13, wherein said first rectangular backing material member is comprised of one of the following: plastic, metal, wood, or rubber.

15. The panel of claim 14, wherein the means for attaching are comprised of one of the following: mechanical fasteners or adhesives.

16. The panel of claim 13 further comprising a second rectangular backing material member and wherein said means for attaching are capable of attaching said multiplicity of tire tread sections between both of said first and said second rectangular backing material members and wherein said multiplicity of tire treads are attached between the two rectangular backing material members along the top walls thereof to the bottom walls of said first and said second rectangular backing material members.

17. The panel of claim 13, wherein the outer surface of the tire tread sections of said multiplicity of tire tread sections is texturized.

* * * * *

UNITED STATES PATENT AND TRADEMARK OFFICE
CERTIFICATE OF CORRECTION

PATENT NO. : 5,873,208
DATED : February 23, 1999
INVENTOR(S) : David Nowacek

It is certified that error appears in the above-identified patent and that said Letters Patent is hereby corrected as shown below: On the title page, Item [57],

```
[Abstract, line 5]   [dye] should read --die--
[Col. 1, line 40]    [dye] should read --die--
[Col. 2, line 59]    [dye] should read --die--
[Col. 5, line 17]    [provided] should read --provide--
```

Signed and Sealed this

Twenty-seventh Day of July, 1999

Attest:

Q. TODD DICKINSON

Attesting Officer

Acting Commissioner of Patents and Trademarks